(12) United States Patent
Maki

(10) Patent No.: US 11,659,083 B2
(45) Date of Patent: May 23, 2023

(54) INFORMATION PROCESSING DEVICE AND RECORDING METHOD

(71) Applicant: LENOVO (SINGAPORE) PTE. LTD., Singapore (SG)

(72) Inventor: Koutaroh Maki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/449,431

(22) Filed: Sep. 29, 2021

(65) Prior Publication Data

US 2022/0174148 A1 Jun. 2, 2022

(30) Foreign Application Priority Data

Nov. 30, 2020 (JP) .............................. JP2020-198260

(51) Int. Cl.
*H04M 3/42* (2006.01)

(52) U.S. Cl.
CPC .............................. *H04M 3/42221* (2013.01)

(58) Field of Classification Search
CPC ............................................... H04M 3/42221
USPC ......................................................... 379/85
See application file for complete search history.

(56) References Cited

U.S. PATENT DOCUMENTS

| 5,845,240 | A | * | 12/1998 | Fielder | G11B 27/34 |
| | | | | | 369/61 |
| 10,387,103 | B2 | * | 8/2019 | Geng | G06F 3/162 |
| 2005/0043948 | A1 | * | 2/2005 | Kashihara | G10L 15/142 |
| | | | | | 704/242 |
| 2013/0110565 | A1 | * | 5/2013 | Means, Jr. | G06Q 10/063 |
| | | | | | 705/7.11 |
| 2014/0192966 | A1 | * | 7/2014 | Zhang | H04M 1/656 |
| | | | | | 379/88.08 |
| 2015/0003595 | A1 | * | 1/2015 | Yaghi | H04M 3/5175 |
| | | | | | 379/85 |
| 2015/0363165 | A1 | * | 12/2015 | Zhou | G06F 9/445 |
| | | | | | 715/728 |
| 2018/0336902 | A1 | * | 11/2018 | Cartwright | G06F 16/61 |
| 2020/0162783 | A1 | * | 5/2020 | Chanquion | H04N 21/4341 |

FOREIGN PATENT DOCUMENTS

| JP | 2007081507 A | 3/2007 |
| JP | 2011216984 A | 10/2011 |
| JP | 2019046047 A | 3/2019 |
| JP | 2020058014 A | 4/2020 |

* cited by examiner

*Primary Examiner* — Binh Kien Tieu
(74) *Attorney, Agent, or Firm* — Shimokaji IP

(57) ABSTRACT

An information processing device includes: a detection unit that detects that an application enabling a call with another information processing device over a network occupies a microphone or a speaker; and a recording unit that starts recording of audio data output to the speaker and audio data input from the microphone in the case where the application detects that the microphone or the speaker is occupied.

8 Claims, 4 Drawing Sheets

INFORMATION PROCESSING DEVICE AND RECORDING METHOD

TECHNICAL FIELD

The present disclosure relates to an information processing device and a recording method.

BACKGROUND

In recent years, the opportunities for teleworking have increased, and along with this a video conference has also been held frequently. Regarding this type of video conference, there has been proposed a system that records audio during the conference and records video data displayed on a display unit in order to check the contents of the conference after the end thereof and to convey the contents of the conference to those who could not attend the conference.

SUMMARY

According to the first aspect of the present disclosure, there is provided an information processing device including: a detection unit that detects that an application enabling a call with another information processing device over a network occupies a microphone or a speaker; and a recording unit that starts recording of audio data output to the speaker and audio data input from the microphone in the case of detecting that the application occupies the microphone or the speaker.

DETAILED DESCRIPTION

In certain audio or video recording systems for a video conference, a specific user who set the video conference has the authority to record audio or the like, and therefore each participant could not arbitrarily record audio or the like.

In addition, some communication apps such as Microsoft Teams (registered trademark) and ZOOM (registered trademark), which have become popular in recent years, have a recording function. An input operation for starting the recording function, however, differs depending on the application. Therefore, when a conference or the like is held using an unfamiliar application, the start operation of audio recording or the like has been performed smoothly in some cases. In such a meeting application, the user needs to perform an input operation for starting or stopping the audio recording or the like and therefore is likely to forget the audio recording.

In view of the above, it would be desirable to provide an information processing device and a recording method capable of increasing the convenience of recording.

An embodiment of an information processing device and a recording method according to the present disclosure will be described below with reference to appended drawings. Examples of the information processing device include laptop PCs, desktop PCs, tablet terminals, smartphones, and the like.

Figure 1:
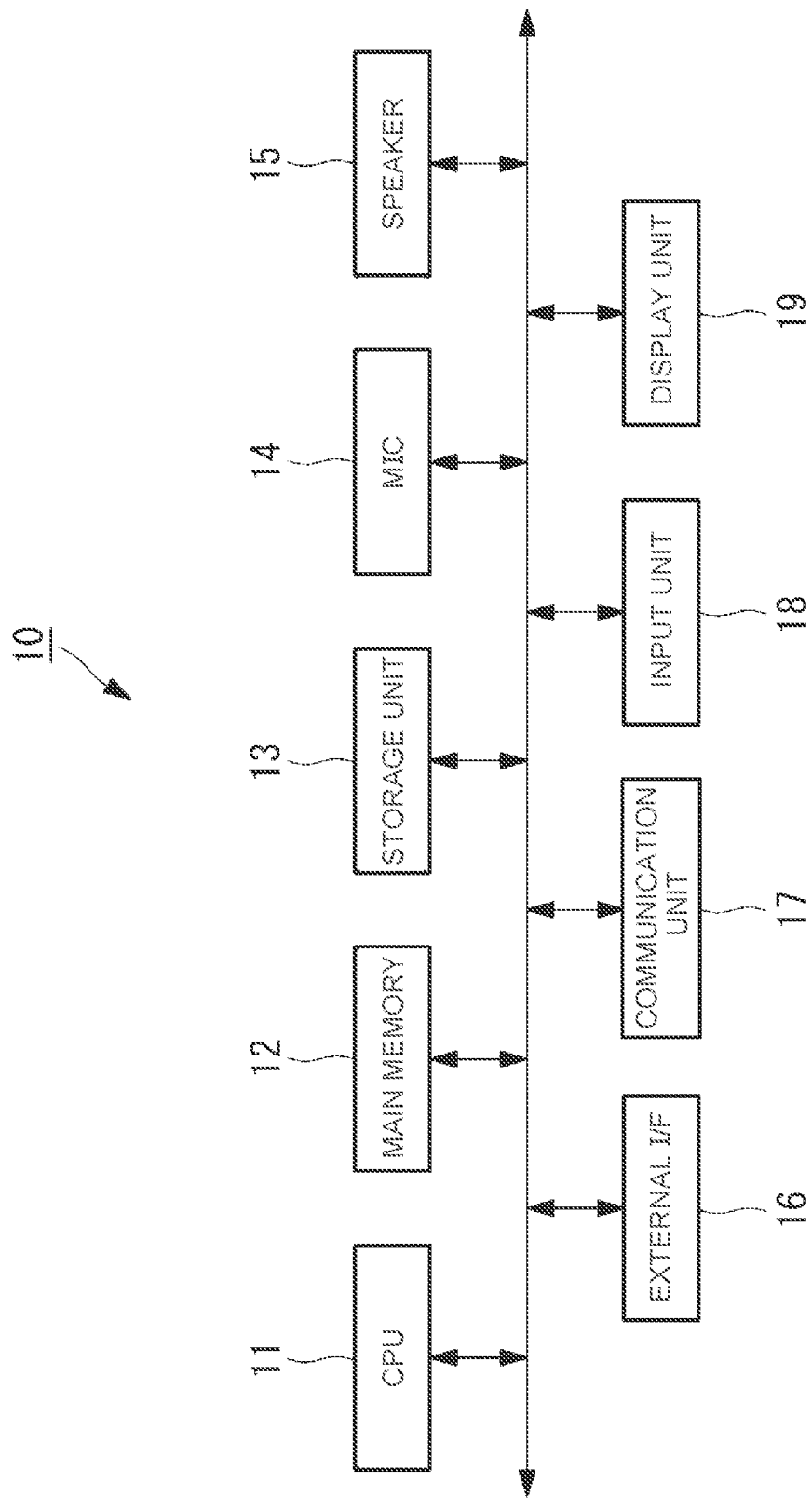
FIG. 1 is a schematic configuration diagram illustrating an example of a hardware configuration of an information processing device according to an embodiment of the present disclosure.

FIG. 1 is a schematic configuration diagram illustrating an example of a hardware configuration of an information processing device 10 according to an embodiment of the present disclosure. As illustrated in FIG. 1, the information processing device 10 includes, for example, a central processing unit (CPU) 11, a main memory 12, a storage unit 13, a microphone (hereinafter, referred to as "mic") 14, a speaker 15, an external interface 16, a communication unit 17, an input unit 18, a display unit 19, and the like. These units are connected to each other directly or indirectly via a bus and perform various processes in cooperation with each other. In addition, the information processing device 10 may be equipped with a camera or the like.

The CPU 11 controls the entire information processing device 10 by an operating system (OS) stored in the storage unit 13 connected to the CPU 11 via the bus, and performs various processes by executing various programs stored in the storage unit 13.

The main memory 12 is composed of writable memories such as a cache memory and a random access memory (RAM) and is used as a work area for reading an execution program of the CPU 11 and for writing data processed by the execution program.

The storage unit 13, which is, for example, a read only memory (ROM), a hard disk drive (HDD), a flash memory, or the like, stores an OS for controlling the entire information processing unit 10 such as, for example, Windows (registered trademark), an iOS (registered trademark), or an Android (registered trademark), various device drivers for operating peripheral devices and the like in hardware, various application software (hereinafter, simply referred to as "applications"), and various data and files. In addition, the storage unit 13 stores programs for implementing various processes and various data required for implementing various processes.

The mic 14, which runs on the basis of a command from the CPU 11, converts an acquired sound into an electric signal and outputs the electric signal.

The speaker 15, which runs on the basis of a command from the CPU 11, converts an electric signal into sound and outputs the sound.

The mic 14 and the speaker 15 may be mounted on the information processing device 10 or may be configured so as to be connected or disconnected via an external interface 16 or a short-range communication, which will be described later, or the like.

The external interface 16 is an interface for connecting to an external device. Examples of the external device include an external monitor, a USB memory, an external HDD, and the like. In the example illustrated in FIG. 1, only one external interface is illustrated, but a plurality of external interfaces may be included.

The communication unit 17 functions as an interface for connecting to a network to communicate with other devices to send and receive information.

The input unit 18 is a user interface for a user to give instructions to the information processing device 10, such as a keyboard, a mouse, and a touch panel.

The display unit 19 has a display screen composed of, for example, a liquid crystal display (LCD), an organic electro luminescence (EL), or the like, and displays the results of an application or the like executed by the information processing device 10.

Figure 2:
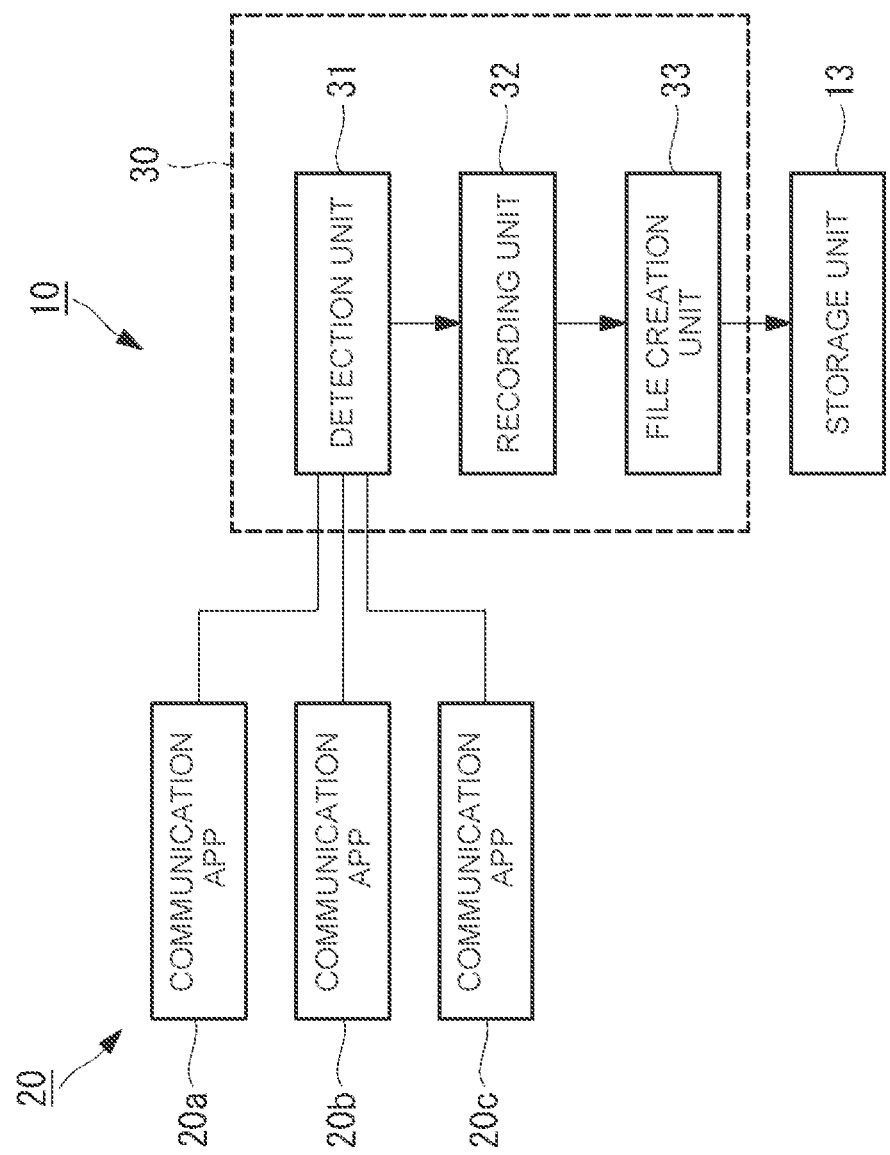
FIG. 2 is a functional block diagram illustrating an example of a recording function among various functions of the information processing device according to an embodiment of the present disclosure.

FIG. 2 is a functional block diagram illustrating an example of a recording function among various functions of the information processing device 10 according to this embodiment. As an example, a series of processes for implementing the various functions described later is stored in the storage unit 13 in the form of a program, and the CPU 11 reads the program into the main memory 12 and performs information processing and arithmetic processing to implement various functions. The program may be pre-installed in the storage unit 13, provided in a state of being stored in another computer-readable storage medium, or distributed via a wired or wireless communication means. The computer-readable storage medium includes a magnetic disk, an opto-magnetic disk, a CD-ROM, a DVD-ROM, a semiconductor memory, and the like.

As illustrated in FIG. 2, the information processing device 10 includes an application (hereinafter, referred to as "communication app") 20 that enables calls via a network with other information processing devices and a recording system 30.

The communication app 20 is, for example, an application for implementing communication using audio and video on the Web. For example, there are Microsoft Teams (registered trademark), ZOOM (registered trademark), LINE (registered trademark), SKYPE (registered trademark), and the like.

Although FIG. 2 illustrates the case of having three communication apps 20*a*, 20*b*, and 20*c*, at least one communication app may be provided. In addition, this communication app 20 may run on a cloud via a web browser and does not necessarily have to be installed on the information processing device 10.

The recording system 30 has a detection unit 31, a recording unit 32, and a file creation unit 33.

The detection unit 31 detects that the communication app 20 occupies the mic 14 (see FIG. 1) or the speaker (see FIG. 1).

For example, if the detection unit 31 detects that any application occupies the mic 14 or the speaker 15 and further the application is a pre-registered communication app 20, the detection unit 31 may detect that the communication app 20 occupies the mic 14 or the speaker 15.

For example, the detection unit 31 has a registration list (so-called "whitelist") in which the application names of the communication apps 20 for which data are recorded are previously registered. Then, in the case where the detection unit 31 detects that any application occupies the mic 14 or the speaker 15, the detection unit 31 determines whether the application name of the application is registered in the registration list. If the application name is registered in the registration list, the detection unit 31 detects that the communication app 20 occupies the mic 14 or the speaker 15.

In addition, the detection unit 31 may have a registration list (so-called "blacklist") in which applications other than those for which data are recorded are registered, instead of the above whitelist. In this case, unless the application that occupies the mic 14 or the speaker 15 is registered in the registration list (blacklist), the detection unit 31 detects that the application for which data are recorded occupies the mic 14 or the speaker 15. For example, the blacklist contains microphone volume setting apps and audio assistant apps.

By using the registration list as a blacklist, data recording is able to be started even with an unknown communication app.

Note that the registration list to be referenced may be different depending on whether the mic 14 is occupied or the speaker 15 is occupied. For example, the application may be determined to be an application for which data are recorded by using the blacklist in which applications other than those for which data are recorded are registered in the case where the occupation of the mic 14 is detected or by using the whitelist in which applications for which data are recorded are registered in the case where the occupation of the speaker 15 is detected. This is because there are generally more applications that occupy the speaker 15 than those that occupy the mic 14. In addition, the application names registered in these registration lists may be those able to be customized by a user.

The above "state in which the mic 14 is occupied" means a state in which the communication app 20 is permitted to use the mic 14, and more specifically, a state in which the OS gives the application the right to use the mic 14 (occupancy right). For example, the state of occupying the mic 14 does not mean a state in which the function of the mic 14 is temporarily switched from OFF to ON in the application by a user's input operation for muting and unmuting during a web conference using the communication app 20.

In addition, the state in which the communication app occupies the speaker 15 means a state in which the communication app 20 is permitted to use the speaker 15. More specifically, the state means a state in which the OS gives the communication app 20 the right to use the speaker 15 (occupancy right).

Moreover, the detection unit 31 detects that the communication app 20 that has occupied the mic 14 or the speaker 15 released the mic 14 or the speaker 15.

In the above, the release of the mic 14 means a state in which the communication app 20 released the right to use the mic 14, and more specifically, a state in which the right to use the mic 14 that has been given to the communication app 20 by the OS is released. For example, the state in which the mic 14 is released does not mean a state in which the function of the mic 14 is temporarily switched from ON to OFF in the application by a user's input operation for muting and unmuting during a web conference using the communication app 20.

In addition, the release of the speaker 15 means a state in which the communication app 20 released the right to use the speaker 15, and more specifically, a state in which the right to use the speaker 15 that has been given to the communication app 20 by the OS is released.

The recording unit 32 starts to record audio data output from the speaker 15 and audio data input from the mic 14 in the case where the detection unit 31 detects that the communication app 20 occupies the mic 14 or the speaker 15. The recording unit 32 records only audio data output from the speaker 15, for example, in the case where it is detected that the communication app 20 occupies the speaker 15 and where the mic 14 is turned off.

In addition, the recording unit 32 may start to record video data output to the display unit 19 (see FIG. 1). The video data to be recorded may be, for example, video data displayed in a window of the application occupying the mic 14 or the speaker 15. This enables a user to avoid recording even video data unrelated to the video conference in the case where the user has multiple windows open.

In addition, the recording unit 32 stops the recording of audio data in the case of detecting that the mic 14 or the speaker 15 that has been occupied by the communication app 20 is released. Moreover, the recording unit 32 also stops the recording of video data in the case where the video data has been recorded.

The file creation unit 33 stores the data recorded by the recording unit 32 as a data file in the storage unit 13. At this time, the data file may be a data file created by merging audio data output to the speaker 15 and audio data input from the mic 14. Furthermore, in the case where video data has been also recorded, the data file may be a data file created by merging the audio data and the video data. Note that, in addition to merging audio data and video data, these data may be stored as individual files in the storage unit 13. Thus, the data storage mode is not particularly limited.

As for the data merging technique, various known techniques are applicable as appropriate.

The file creation unit 33 acquires the application name of the communication app 20 that occupies the mic 14 or the speaker 15 and puts the acquired application name in the title or metadata of the data file stored in the storage unit 13. Moreover, information about the date and time when the recording is performed may be further included in the title or metadata.

Furthermore, the file creation unit 33 may acquire the window title (for example, the meeting name) of the communication app 20 that occupies the mic 14 or the speaker 15, instead of or in addition to the application name, and may put the acquired window title in the title or metadata of the data file stored in the storage unit 13.

The above application name and window title can be acquired from, for example, an OS, calendar information, or the like.

The storage unit 13 stores data recorded by the recording unit 32, and the data file name or metadata thereof includes the title and window title of the communication app that performed the recording. This enables the user to easily check when and which meeting the data corresponds to.

Figure 3:
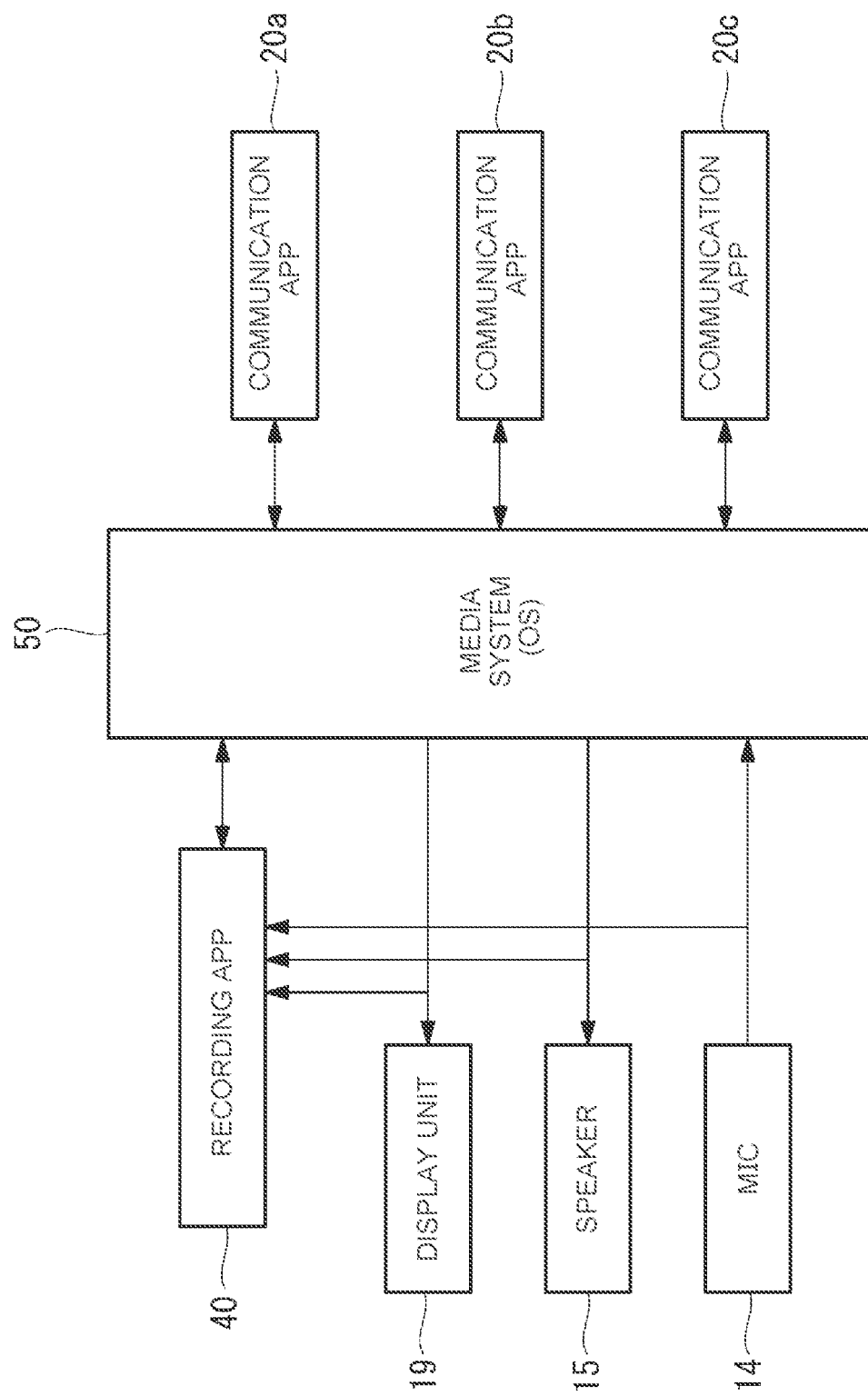
FIG. 3 is a diagram illustrating an example of a software configuration related to the recording function among various functions of the information processing device according to an embodiment of the present disclosure.

Subsequently, an example of a software configuration for implementing the recording method of the information processing device 10 described above will be described with reference to FIG. 3. FIG. 3 is a diagram illustrating an example of the software configuration related to the recording function among various functions of the information processing device 10 according to this embodiment.

As illustrated in FIG. 3, the information processing device 10 includes a communication app 20 (20a to 20c), a recording application (hereinafter, referred to as "recording app") 40, and a media system 50.

The communication app 20 is application software that runs on the OS, and as mentioned above, it is an application that enables calls via a network with other information processing devices.

The recording app 40 is application software that runs on the OS and is an application for implementing the functions of the recording system 30 illustrated in FIG. 2. For example, the recording app 40 is a program for implementing the functions of the detection unit 31, the recording unit 32, and the file creation unit 33 illustrated in FIG. 2.

The media system 50 is an OS component that controls audio and, for example, controls audio output in response to audio-related requests from various applications.

Figure 4:
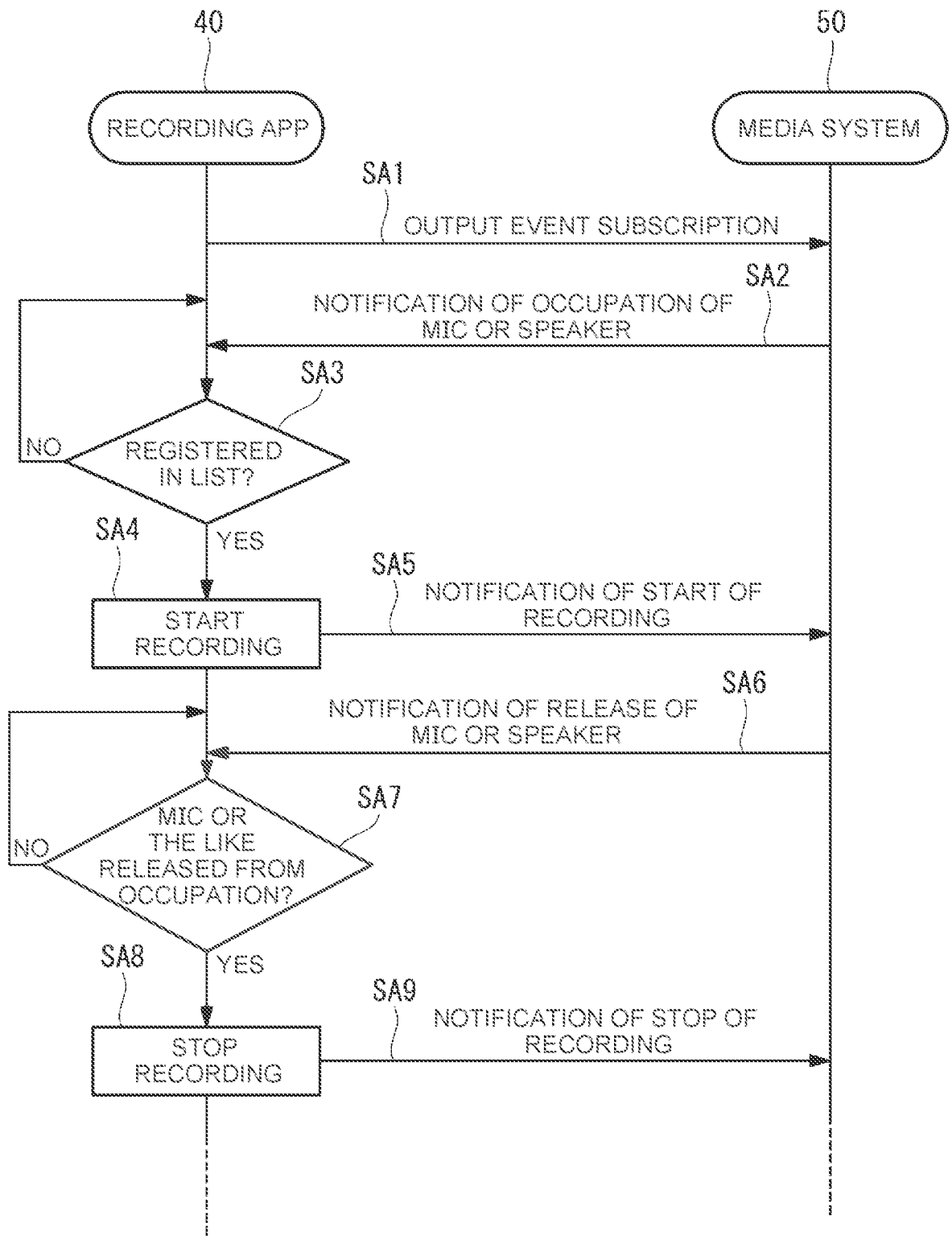
FIG. 4 is a flowchart illustrating an example of a processing procedure of a recording method in an embodiment of the present disclosure.

Subsequently, processing implemented by the recording app 40 will be described with reference to FIG. 4. FIG. 4 is a flowchart illustrating an example of a processing procedure of the recording method in this embodiment. In the following processing procedure, description will be made by way of example of using a registration list (so-called "whitelist") in which an application for performing recording is registered.

First, when the information processing device 10 is started, the recording app 40 is started and an event subscription is output to the media system 50 (SA1). This means that, for example, in the case where a request for occupying the mic 14 (see FIG. 3) or the speaker 15 (see FIG. 3) is input from any application to the media system 50, a notification thereof is requested.

When the request for occupying the mic 14 or the speaker 15 is input from any application running on the OS, the media system 50 notifies the recording app 40 of the occupation of the mic 14 or the speaker 15 (SA2). At this time, the media system 50 also outputs the name of the application that issued the request for occupying the mic 14 or the speaker 15 together with the occupation notification.

Upon receiving the notification of occupying the mic 14 or the speaker 15, the recording app 40 determines whether the application name in the notification output from the media system 50 together with the occupation notification corresponds to the communication app 20 registered in the registration list ("whitelist") (SA3). Unless the application name is registered in the registration list as a result (SA3: NO), a standby state is maintained until a notification of occupying the mic 14 or the speaker 15 is received again, without performing recording. If the application name is registered in the registration list (SA3: YES), the occupation of the mic 14 or the speaker 15 by the communication app 20 is detected and recording is started (SA4).

Upon starting the recording, the recording app 40 notifies the media system 50 of the start of recording (SA5). At this time, the recording app 40 may display a message such as "Recording starts" on the display unit 19 to notify the user of the start of audio recording.

Subsequently, upon input of a request for releasing the mic 14 or the speaker 15 to the media system 50 from the application that has occupied the mic 14 or the speaker 15 due to an end of a conference or a call or the like, the media system 50 notifies the recording app 40 of the release of the mic 14 or the speaker 15 (SA6). Furthermore, in addition to the notification of the release, the media system 50 outputs information (for example, an application name) on the application that has issued the request for releasing the mic 14 or the speaker 15 to the recording app 40.

Upon receiving the notification of releasing the mic 14 or the speaker 15, the recording app 40 determines whether the mic 14 or the speaker 15 is released from the occupation by the communication app 20 that has been a target of recording (SA7). If the determination is negative as a result (SA7: NO), the audio recording is continued as it is. On the other hand, if the determination is positive (SA7: YES), the release of the mic 14 or the speaker 15 by the communication app 20 is detected and the recording is stopped (SA8). Upon stopping the recording, the recording app 40 notifies the media system 50 of the recording stop (SA9). At this time, the recording app 40 may display a message such as "Recording ends" on the display unit 19 to notify the user of the end of audio recording.

Upon the end of recording as described above, for example, the storage unit 13 stores data created by merging, for example, audio data and video data of a video conference or the like as a data file. Moreover, for example, the file name and metadata of the data file includes attribute information such as the application name, the window title, and the meeting date and time of the communication app 20 that has occupied the mic 14 or the speaker 15.

Then, the above-mentioned processing of SA2 to SA9 is repeated until the information processing device 10 is shut down, by which the audio data and video data of the conference are automatically stored in the storage unit 13 every time a video conference or the like is performed.

As described hereinabove, according to the information processing device 10 and the recording method of this embodiment, the recording of the audio data input to the mic 14, the audio data output to the speaker 15, and the like is started upon detecting that the communication app 20 has occupied the mic 14 or the speaker 15, while the recording of the audio data and the like is stopped upon detecting that the communication app 20 has released the mic 14 or the speaker 15. Thereby, the audio data of a conference or the like are automatically recorded without a user's input operation for audio or video recording. This enables an increase in convenience. Furthermore, audio recording for audio data or the like is able to be performed locally, and therefore the user does not have to worry about other participants.

Furthermore, the recording of audio data and the like is started depending on whether the speaker 15 has been occupied, thereby enabling use for recording in the case of attending a conference without using the mic 14 such as, for example, in the case of providing a seminar to multiple participants via the Web.

Moreover, recorded audio data is digital audio data output from the mic 14 and digital audio data output from the media system 50 to the speaker 15 as illustrated in FIG. 3, by which the recorded audio data can be recorded with higher sound quality and the data volume of the audio data can be reduced as compared with the case of recording analog data.

Furthermore, in the case of recording video data at the same time as audio data, there is recorded the video data displayed in the window of the communication app 20 that occupies the mic 14 or the speaker 15. This makes it possible to avoid recording video data other than those of a conference, for example, in the case of working with other windows displayed.

In addition, the title or metadata of the data file stored in the storage unit 13 includes the application name and window title (for example, a meeting name) of the communication app 20 used for holding a conference or the like, thereby enabling the user to easily search for and find a desired data file.

In the information processing device 10 and the recording method according to this embodiment, audio data and video data are automatically recorded as described above, which may squeeze available data space of the storage unit 13. Therefore, for example, in the case where a predetermined data volume is exceeded, an alarm may be issued to the user, or a function may be provided to automatically delete old data. For example, since the volume of video data is larger than the volume of audio data, image frames may be extracted from old video data at predetermined time intervals and only the extracted image frames may be recorded in the case where the volume of video data exceeds a predetermined value. Specifically, the compression level of the video data is adjusted to be higher for older video data.

Although the present disclosure has been described above using the embodiments, the technical scope of the present disclosure is not limited to the scope described in the above embodiments. Various modifications or improvements can be made to the above embodiments without departing from the gist of the invention, and the modified or improved forms are also included in the technical scope of the present disclosure. Further, the above embodiments may be combined as appropriate.

In addition, the procedure for the recording method described in the above embodiment is also an example, and unnecessary steps may be deleted, new steps may be added, and the processing order may be changed without departing from the gist of the present disclosure.

The invention claimed is:

1. An information processing device comprising:
    a detection unit that detects that an application enabling a call with another information processing device over a network occupies a microphone or a speaker;
    a recording unit that starts recording of audio data output to the speaker and audio data input from the microphone in the case of detecting that the application occupies the microphone or the speaker; and
    a file creation unit that acquires a name of the application that occupies the microphone or the speaker and puts the acquired application name in a file name or puts metadata of the data recorded by the recording unit in a file.

2. The information processing device according to claim 1 wherein:
    the detection unit detects that the application has released the microphone or the speaker; and
    the recording unit stops the recording of the audio data in the case of detecting that the microphone or the speaker is released.

3. The information processing device according to claim 1, wherein the recording unit starts recording of video data output to a display unit in the case of detecting the occupation of the microphone or the speaker and stops the recording of the video data in the case of detecting a release of the microphone or the speaker.

4. The information processing device according to claim 3, wherein the recording unit records the video data displayed in a window of the application that occupies the microphone or the speaker.

5. An information processing device comprising:
    a detection unit that detects that an application enabling a call with another information processing device over a network occupies a microphone or a speaker;
    a recording unit that starts recording of audio data output to the speaker and audio data input from the microphone in the case of detecting that the application occupies the microphone or the speaker; and
    a file creation unit that acquires a window title of the application that occupies the microphone or the speaker and puts the acquired window title in a file name or puts metadata of the data recorded by the recording unit in a file.

6. The information processing device according to claim 5 wherein:
    the detection unit detects that the application has released the microphone or the speaker; and
    the recording unit stops the recording of the audio data in the case of detecting that the microphone or the speaker is released.

7. The information processing device according to claim 5, wherein the recording unit starts recording of video data output to a display unit in the case of detecting the occupation of the microphone or the speaker and stops the recording of the video data in the case of detecting a release of the microphone or the speaker.

8. The information processing device according to claim 7, wherein the recording unit records the video data displayed in a window of the application that occupies the microphone or the speaker.

* * * * *